US00RE37497B1

(19) United States
(12) Reissued Patent
Morello et al.

(10) Patent Number: US RE37,497 E
(45) Date of Reissued Patent: Jan. 8, 2002

(54) APPARATUS AND METHOD FOR FORMING METAL BUILDING PANELS

(75) Inventors: Frederick Morello, Johnstown, PA (US); Christopher K. Kastner, Wickliffe, OH (US); Charles A. Murphy, Somerset, PA (US)

(73) Assignee: MIC Industries, Inc., Reston, VA (US)

(21) Appl. No.: 09/215,022

(22) Filed: Dec. 17, 1998

Related U.S. Patent Documents

Reissue of:
(64) Patent No.: 5,584,198
Issued: Dec. 17, 1996
Appl. No.: 08/425,440
Filed: Apr. 20, 1995

(51) Int. Cl.[7] ..... B21D 13/04
(52) U.S. Cl. ..... 72/8.3; 72/10.1; 72/168; 72/177
(58) Field of Search ..... 72/10.1, 168, 177, 72/182, 174, 11.1, 8.3

(56) References Cited

U.S. PATENT DOCUMENTS

| | | | | |
|---|---|---|---|---|
| 1,015,429 A | | 1/1912 | Fahrney | 72/177 |
| 1,617,069 A | | 2/1927 | McLaughlin | 72/177 |
| 2,775,284 A | | 12/1956 | Hermann | 72/168 |
| 3,842,647 A | | 10/1974 | Knudson | 72/177 |
| 4,364,253 A | * | 12/1982 | Knudson | 72/181 |
| 4,505,143 A | * | 3/1985 | Knudson | 72/181 |

FOREIGN PATENT DOCUMENTS

| | | | |
|---|---|---|---|
| JP | 116934 | 7/1983 | 72/177 |
| JP | 148426 | 6/1989 | 72/168 |
| NL | 8402051 | 1/1986 | 72/177 |

* cited by examiner

*Primary Examiner*—Daniel C. Crane
(74) *Attorney, Agent, or Firm*—Jones, Day, Reavis & Pogue; Blaney Harper

(57) ABSTRACT

Apparatus and method for crimping the side walls of a sheet metal building panel independently of a main crimper which crimps the belly of the panel. The depth and the position along the panel of the side crimp is adjusted independently of the main crimpers in relation to the radius the panel is being curved and the length of panel that has passed through the apparatus. The adjustment is controlled by a microprocessor. The microprocessor controls a hydraulic motor which drives a machine screw which activates a scissors-jack type linkage. Blocks holding the rotatably mounted crimping rollers are mounted on slides and attached to the linkage. As the linkage moves, the depth of the crimping rollers is adjusted. The rotation of the crimping rollers is hydraulically driven through a gear-sprocket rotary motion drive train.

34 Claims, 4 Drawing Sheets

APPARATUS AND METHOD FOR FORMING METAL BUILDING PANELS

Matter enclosed in heavy brackets [ ] appears in the original patent but forms no part of this reissue specification; matter printed in italics indicates the additions made by reissue.

*This application is a Reissue of Ser. No. 08/425,440, filed Apr. 20, 1995, now U.S. Pat. No. 5,584,198, issued Dec. 17, 1996.*

BACKGROUND OF THE INVENTION

1. Field of the Invention

This invention relates generally to machines and methods for forming metal panels for constructing metal buildings, and more particularly relates to apparatus and methods for forming curved building panels from flat sheet metal material by crimping.

2. Background and Prior Art

It is known in the prior art to construct metal buildings from metal panels which are arched or curved, assembled side-by-side and seamed together. See U.S. Pat. No. 3,902,288 to Knudson. In such buildings the roof panels continue as the side walls of the building and the basic building construction is in the shape of a self-supporting continuous arch or semicircle when viewed from one end. A machine for making the building panels in which U-shaped panels are corrugated or crimped both on the bottom or "belly" and on the sides to create the curvature is shown in U.S. Pat. No. 3,842,647 to Knudson.

An arched building construction in which the walls and roof are completely arched has advantages, but also has a number of limitations. One limitation is the absence of vertical walls which limits the use of vertical space. Users of metal buildings often want vertical walls both for aesthetic purposes as well as to obtain the use of more vertical space near the edges to the building. The basic size and strength of such metal buildings is also limited by wind and live load limitations as established by local and national building codes. A completely arched building must be limited in size in order to prevent overloading as could occur from extensive wind loads produced by hurricanes. However, when the total roof height is reduced to approximately one-fifth of the total building width, hurricane force winds do not affect the building as much because of the reduced frontal area.

Improvements to the above technology are disclosed in U.S. Pat. Nos. 5,249,445 and 5,359,871 to Morello, incorporated by reference herein in their entirety. These patents disclose microprocessor-controlled methods and apparatus wherein metal building panels could be formed by automatically controlling the radius of curvature and wherein the panels may have a straight as well as a curved portion so that metal panel buildings could be constructed with arched roofs and vertical walls. The cited Morello patents disclose the use of hydraulics and microprocessor controlled machinery which forms U-shaped building panels of predetermined length from a coil of sheet metal. The formed panels are then continuously crimped on their side edges for strength and are adjustably curved by crimping the belly of the panel. The crimping is automatically controlled so that building panels may be formed with vertical wall portions and curved or arched roof portions.

A problem in the prior art, however, was the fact that the depth of the crimp on the side edges of the panel remained constant, even as the radius of the panel being curved changed. If the radius of the panel was tight, and the depth of side crimp was shallow, the side walls of the panel buckled due to the excess material not taken up by the crimp. Analogously, if the radius was large or the panel section being formed was straight, and the depth of side crimp was deep, the belly of the panel buckled due to excess material in the belly not taken up by the crimping. Because of the physical distance between the side crimping apparatus and the main crimping apparatus, the simultaneous adjustment of the side and main crimping apparatus caused the length of panel between the side crimper and the main crimper during this adjustment not to have the change in depth of crimp on the side walls, which caused the buckling effect discussed above. Thus, there exists a need in the art for improvement to such apparatus and methods to eliminate the deleterious buckling effects caused by adjustment of the crimping mechanisms during formation of such panels.

SUMMARY OF THE INVENTION

The panel crimping apparatus and method of the present invention is unique in that the depth of crimp in the side portion of a metal building panel is controlled by a microprocessor and the side crimping rollers are adjusted independently of the main crimping rollers, according to the radius of panel being curved and the length of panel that has passed through the apparatus. The present invention thus eliminates the problem of metal panel buckling in the prior art when the radius of curvature of a building panel was varied during formation.

The crimping apparatus includes two sets of rotatably mounted panel side portion crimping rollers with the sets mounted vertically with respect to each other and the rollers mounted horizontally on shafts. The outside roller of each set is rotatably mounted on a shaft supported at both ends by stationary bearings. The inside roller of each set is rotatably mounted on a cantilevered shaft supported on only one end by bearings. The bearings of the cantilevered shaft are mounted in a non-stationary sliding block that is movable in the direction of the stationary crimping rollers, thus creating a change in the depth of crimp by changing the distance between the inside roller and the outside roller. The sliding mechanism consists of male and female V-grooved guide bars, with the male guide bar being attached to the sliding block and the female guide bar being attached to a main support plate. Extending through the center of the main plate is a machine screw which is supported on the reverse side of the main plate by a block that houses three angular-contact bearings. On this machine screw is a bronze nut that is attached to a block mounted horizontally in a plane at a right angle to the crimping rollers. This block is the center point for a scissors-jack type linkage that extends to each of the two non-stationary crimping roller blocks. The linkage is such that as the machine screw is rotated, the linkage center block moves along the screw to cause the non-stationary crimping roller blocks to slide in the direction perpendicular to the screw and thus change the depth of crimp.

Mounted on the opposite side of the machine screw is a universal joint which constitutes a coupling to a hydraulic motor. A linear encoder tracks the position of the center linkage block along the length of the machine screw and sends that information to a microprocessor. A rotary encoder tracks the length of panel that is being crimped by the apparatus and sends that information to the microprocessor. The rotation of the hydraulic motor that controls the depth of crimp is controlled by a valve that is controlled by the microprocessor. The microprocessor determines when to adjust the crimping rollers and to what depth based on the information received from the encoders.

Each shaft that supports the crimping rollers also supports a gear that fits into a drive train. This drive train is driven by a hydraulic motor separate from the motor that adjusts the crimping depth. The drive train motor controls the rotary motion of both the side crimping rollers and the main crimping rollers, and is also controlled by the microprocessor.

DETAILED DESCRIPTION OF THE PREFERRED EMBODIMENTS

Figure 1:
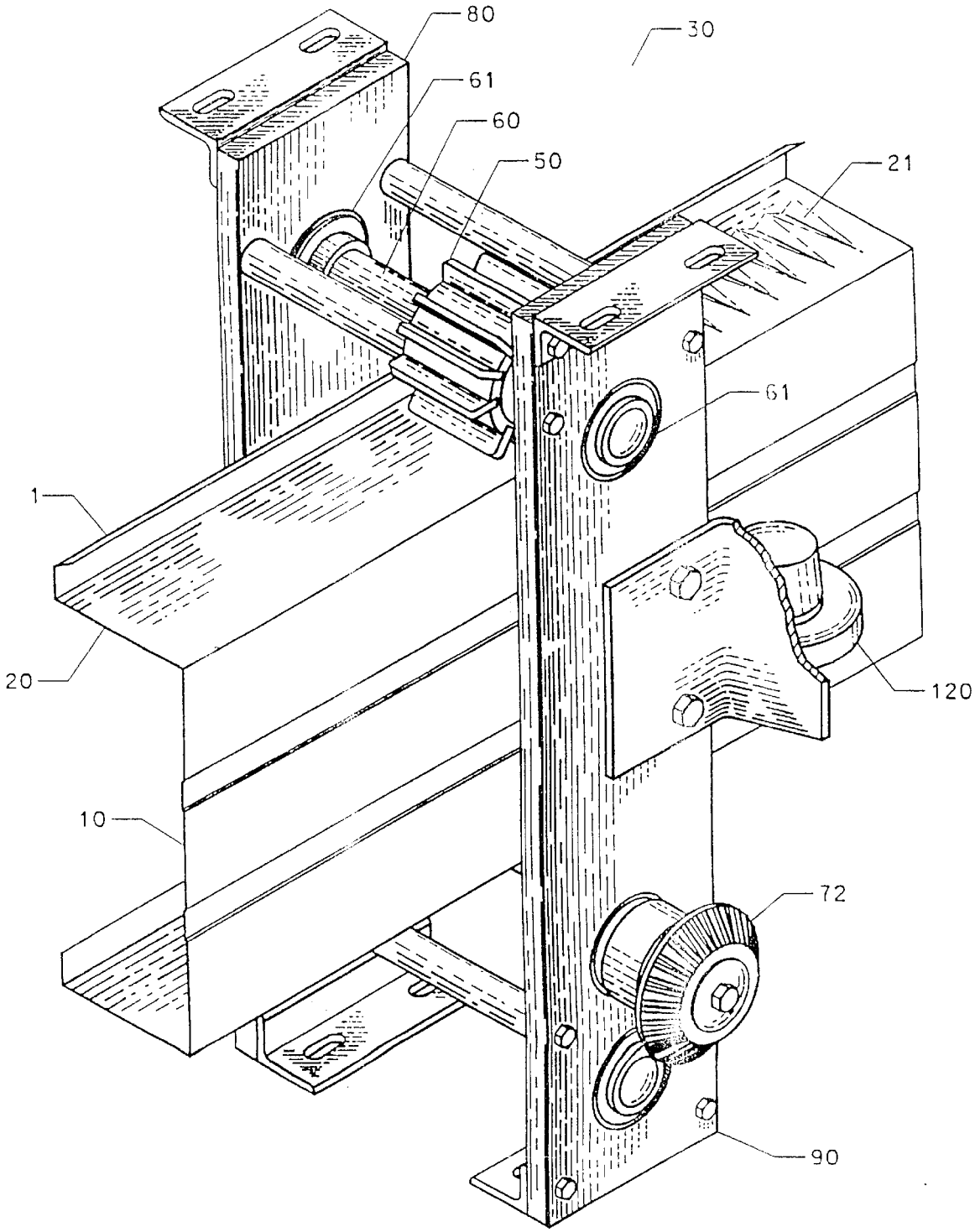
FIG. 1 is an isometric view of a preferred embodiment of the side crimper apparatus disconnected from the entire building panel forming machine and showing a portion of a panel midway through the side crimper.
Figure 2:
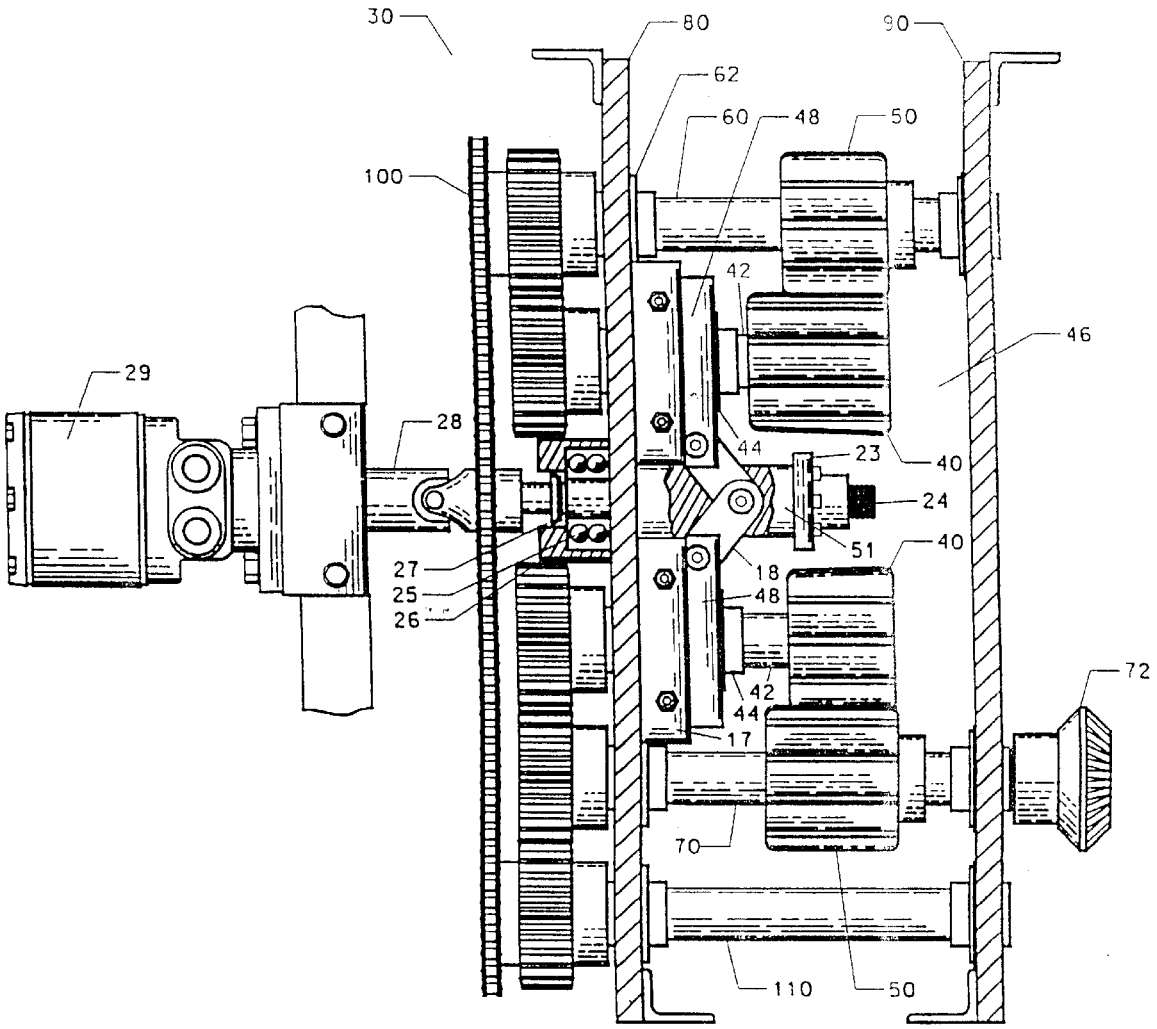
FIG. 2 is a side view of the side crimper apparatus of FIG. 1 from the direction of entry of the panel.
Figure 3:
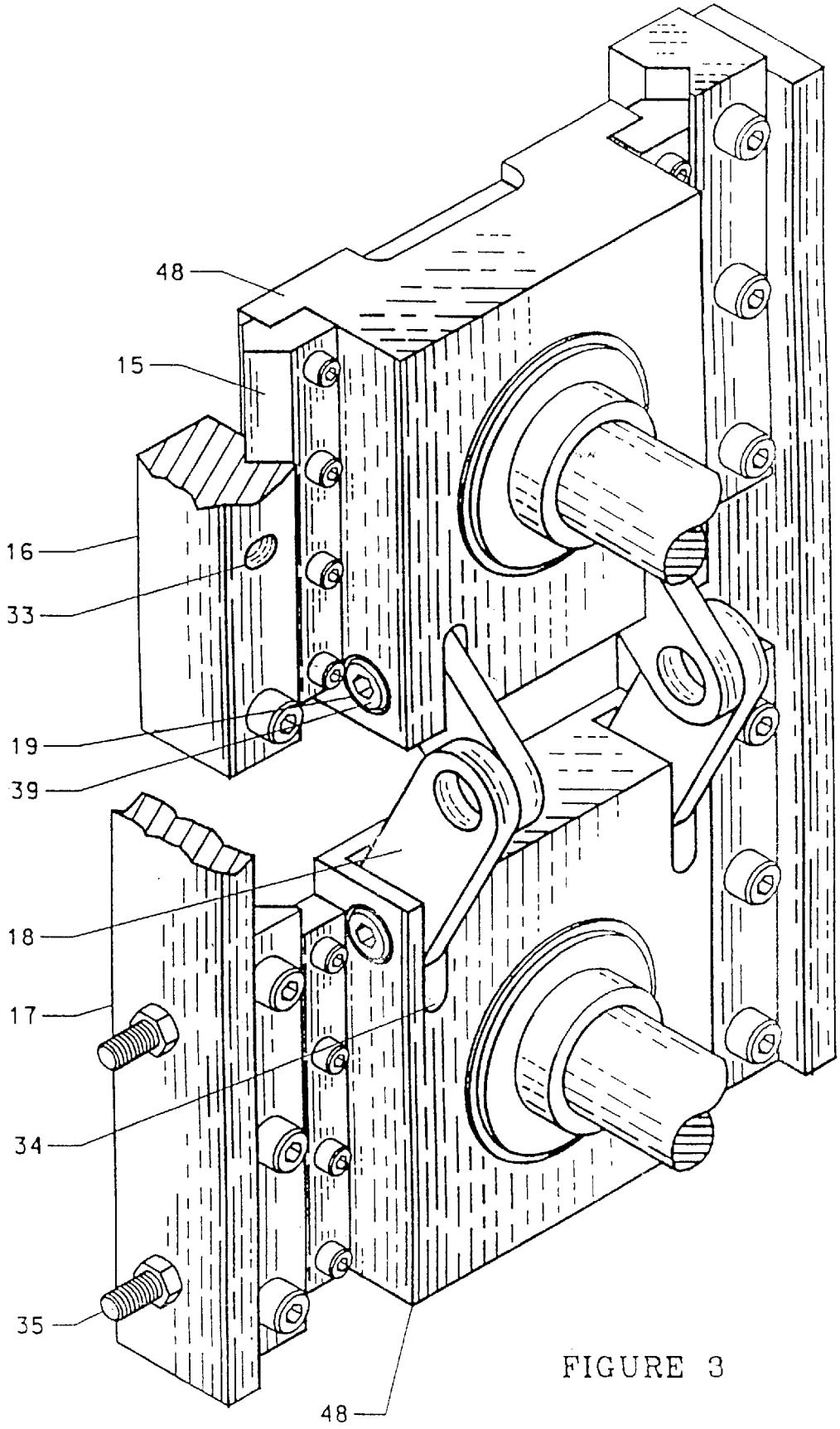
FIG. 3 is an isometric view of the slide blocks and linkage arms of the side crimper apparatus according to a preferred embodiment of the invention.

The present invention will now be described in detail, referring to FIGS. 1–4. The panel 1 being crimped has a bottom or "belly" 10 and two sides 20 at 90 degrees to the belly. The panel feeds into the side crimping apparatus 30 in the orientation shown. There are inside crimping rollers 40 (FIG. 2) and opposing outside crimping rollers 50. The rollers consist of a steel hub with blades welded radially around the perimeter of the hub so as to cause a corrugated crimp 21 in the sheet metal panel when it is passed through mating sets of rollers. The top outside crimping roller is rotatably mounted on a steel shaft 60 that is supported on both ends by bearings 62. The bearings are mounted in a steel main plate 80 and an aluminum outside plate 90. On the main plate side, the top shaft 60 continues through bearing 62 and supports a gear and sprocket which are components of rotary motion drive train 100. The bottom outside shaft 70 differs from shaft 60 only in that it is not directly connected to drive train 100 but continues through the bearing housed in the outside plate 90 and supports a miter gear 72 that serves as a link to the main curver drive train (not shown), which powers the forward rotation of the crimping rollers 40 and 50. The bottom shaft 110 is supported by a bearing at each end with one end continuing through the main plate bearing to support a gear and sprocket which are further components in the rotary motion drive train 100.

The rotary motion drive train 100 is configured such that the top and bottom sets of crimping rollers rotate together to feed the panel 1 through the apparatus. The inside crimping rollers 40 are rotatably mounted on cantilevered shafts 42 which are supported only on one end by bearings 44 so as to allow the belly 10 of the panel to pass through the other side 46. The bearings 44 are press fitted into aluminum slide blocks 48. In each slide block 48 there are two bearings (not shown) mounted back to back to aid in supporting the load of the panel being crimped.

The shafts 42 continue through the slide blocks 48 and the main plate 80 to support gears that fit into the rotary drive train. Each edge of the slide blocks 48 holds a male guide bar 15 (FIG. 3) which slides vertically along a female guide bar 16. The guide bars 15 and 16 are "V" grooved in shape. This causes the slide bars to be self-centering and to have a large contact area to aid in high load support. All edges of the male guide bar 15 are rounded to prevent them from catching or knifing into the female guide bar 16 as they are sliding. The female guide bars 16 are permanently attached to the main plate 80. Both sets of guide bars are constructed of high strength, hardened steel that has an Armoloy plating. All of these features lead to a durable, low friction slide made to withstand high loads.

Mounting holes 33 in the female guide bars are slotted so as to allow the female guide bars to adjust closer to the male guide bars and ensure that they seat firmly together so as to take advantage of the self-centering properties of the "V" groove. Steel stiffener plates 17, which are attached to main plate 80, hold set screws 35 which tighten onto the backs of the female guide bars to perform this adjustment and to ensure that the guide bars will not slip back after the adjustment. The stiffener plates 17 also prevent the main plate 80 from flexing due to the loading. The inner ends of the slide blocks 48 have milled slots 34 which accommodate steel linkage arms 18. The linkage arms are mounted at one end to the sliding blocks 48 using Teflon permeated plane bearings 19 which ride on high tensile strength precision ground shoulder bolts 39 so as to allow a pivoting motion of the linkage arms with respect to the sliding blocks.

The other end of the linkage arms 18 are connected to a steel, Armoloy coated center linkage block 51 (FIG. 4) via additional shoulder bolts. Center linkage block 51 has the male portion of a dovetail joint machined into both ends. The female portion of the dovetail joint is machined into two steel, Armoloy coated upright guide blocks 52. The purpose of the Armoloy coating is rust prevention and an extremely hard, smooth surface to act as a bearing surface. The upright blocks 52 are solidly mounted to both the main plate 80 and the stiffener plates 17 for extra rigidity. This configuration allows the center linkage block 51 to travel only in a linear horizontal sliding motion, preventing the panel load from forcing the entire inside roller and slide block assembly along the vertical plane.

Figure 4:
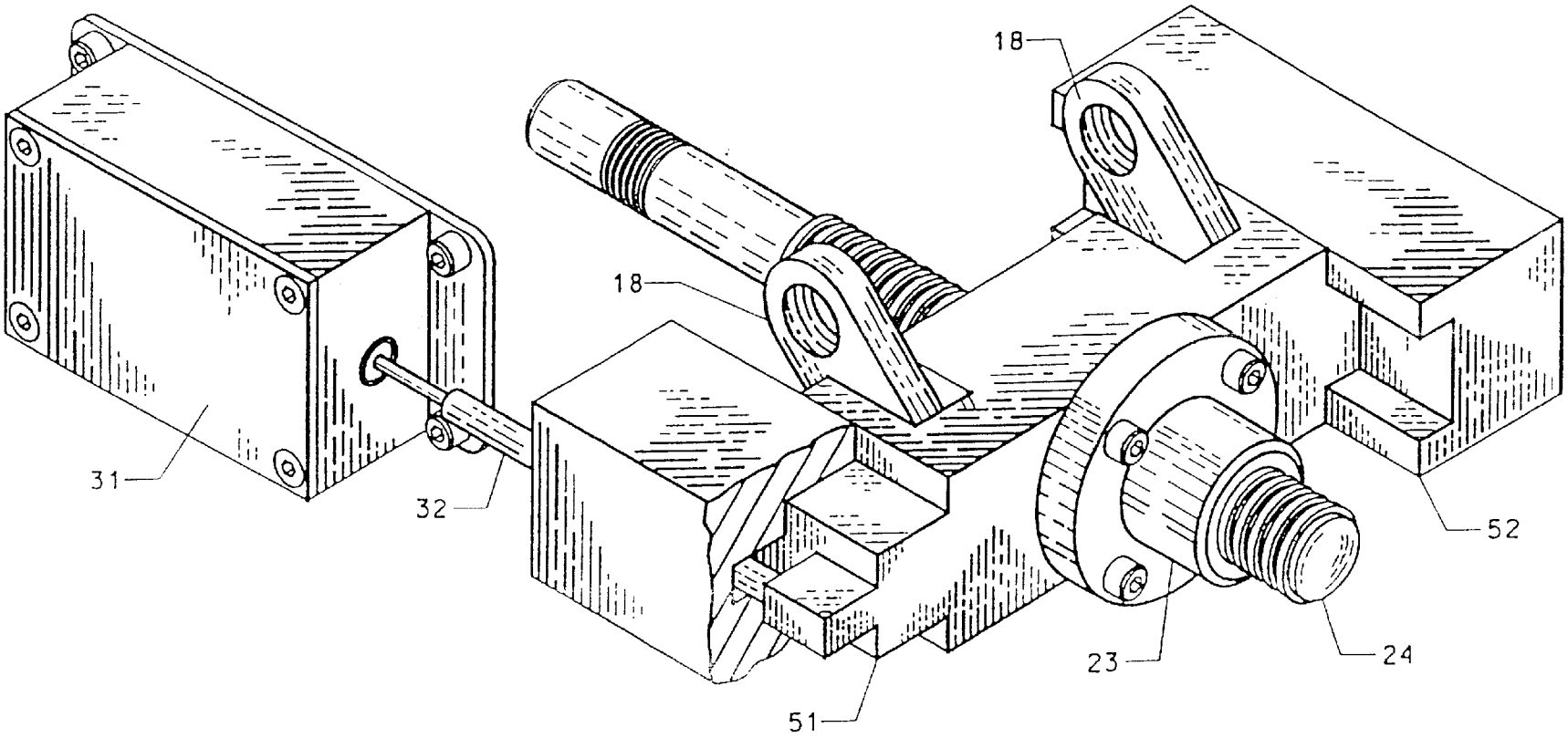
FIG. 4 shows an isometric view of the center linkage adjustment mechanism of the side crimper apparatus according to the present invention.

The center linkage block 51 houses a bronze acme-threaded bearing nut 23 (FIG. 4). Machine screw 24 travels through a clearance hole in the center linkage block 51, a clearance hole in the main plate 80, and into a set of three angular contact bearings 25 (FIG. 2) that are housed in an aluminum bearing block 26. Angular contact bearings have the ability to support both axial and radial loads. Two of the three bearings are oriented to support an axial load in the direction towards the outside plate 90 and the third bearing is mounted opposite of the other two. The machine screw 24 is constrained from axial travel by a machined shoulder that rests against the third angular contact bearing on the side closest to the main plate 80, and a threaded bearing nut 27 on the opposite side of main plate 80 to remove any axial play, ensuring an accurate system.

A universal joint 28 provides a rotary link between the machine screw 24 and a hydraulic motor 29. As the machine screw 24 is turned by the motor 29, the nut 23 causes the center linkage block 51 to travel axially along the machine screw. As the center linkage block 51 moves closer to the main plate 80, the linkage arms 18 flatten vertically and push against the slide blocks 48, causing them to slide along the guide bars toward the stationary outside crimper rollers 50, thus moving inside crimper rollers 40 closer to rollers 50, resulting in a deeper crimp. When the rotation of the machine screw is reversed, the center linkage block 51 travels away from the main plate 80, pulling the linkage arms 18 with it. This causes the slide blocks 48 to be pulled down along the guide bars, moving inside rollers 40 away from the stationary crimper rollers 50, resulting in a shallower crimp.

A microprocessor (not shown) controls the valves that control the hydraulic motor 29. The microprocessor receives inputs from a rotary encoder 120 (FIG. 1) and a linear encoder 31 (FIG. 4). The rotary encoder measures the length of panel that has traveled through the apparatus. The linear encoder is linked through a stainless steel shaft 32 to the center linkage block 51, enabling the encoder to track the linkage block's position along the machine screw and relay that information to the microprocessor. The microprocessor determines at what depth the side crimpers need to be at predetermined locations along the panel length, independently from the main crimpers. The aforementioned U.S. Pat. No. 5,359,871 discloses other capabilities and functions of the mentioned microprocessor.

The side crimper control function of the microprocessor has the ability to perform the following tasks:

enable/disable the entire side crimper adjust function;

determine the depth of crimp as a function of panel material thickness and radius at which the panel is being curved;

control the direction and start/stop of the hydraulic motor 29 to reach the desired depth of crimp;

control the speed of the hydraulic motor including a standard high and low speed;

set electronic safety stops for the maximum and minimum depth of crimp;

LCD readout of the rotary and linear encoder positions; and determine the position along the panel to begin adjusting as a function of the type of panel being formed, the speed at which the curver is being run, and the total change of depth.

Of course, the microprocessor may be used to carry out many other functions in addition to those mentioned above.

The invention having been thus described, it will be apparent to those skilled in the art that the same may be varied in many ways without departing from the spirit and scope of the invention. Any and all such modifications as would be obvious to those skilled in the art are intended to be within the scope of the following claims.

What is claimed is:

1. In an apparatus for automatically producing a building panel from sheet material, the apparatus including a panel former for forming the sheet material into a generally channel-shaped panel having a bottom portion and side portions extending substantially perpendicular to the bottom portion so as to define an interior channel area and exterior areas, a curve former having main crimping rollers for curving the formed panel by crimping said bottom portion, and a side crimper including outside crimping rollers and inside crimping rollers for crimping said side portions, the inside crimping rollers positioned within the interior channel area and the outside crimping rollers positioned in the exterior areas, the improvement in said side crimper comprising:

means for mounting said inside and outside crimping rollers to said side crimper so as to allow a distance between said inside and outside crimping rollers to be adjusted independently of adjustment of said main crimping rollers;

means for adjusting the distance between said inside and outside crimping rollers independently of adjustment of said main crimping rollers;

means for producing signals indicative of the distance between said inside and outside crimping rollers;

means for producing signals indicative of a length of said formed panel having passed through the apparatus; and means for controlling said adjusting means in response to said distance signals and said length signals based on a predetermined desired panel configuration.

2. Apparatus according to claim 1, wherein said mounting means comprises movable shaft means for mounting said inside crimping rollers to be movable toward and away from said outside crimping rollers.

3. Apparatus according to claim 2, wherein said mounting means further comprises stationary shaft means for mounting said outside crimping rollers to be stationary.

4. Apparatus according to claim 2, wherein said adjusting means comprises a first sliding block mounted to a support plate of said apparatus and supporting said movable shaft means.

5. Apparatus according to claim 4, wherein said adjusting means further comprises:

a second sliding block mounted to said support plate and supporting said movable shaft means;

a center linkage block coupled to said first and second sliding blocks;

a machine screw coupled to said center linkage block for adjusting the position of said center linkage block as a function of rotation of said machine screw; and motor means for rotating said machine screw.

6. Apparatus according to claim 5, wherein said distance signal producing means comprises a linear encoder for encoding the position of said machine screw relative to said support plate which is a function of the distance between said inside and outside crimping rollers, and said length signal producing means comprises a rotary encoder for encoding the amount of travel of said formed panel through said apparatus which is a function of the length of panel passing through said apparatus.

7. Apparatus according to claim 6, wherein said controlling means comprises a microprocessor which receives said length signals and distance signals, determines the depth of crimping to be applied to said side portions of said panel and the position along said panel at which said depth of crimping is to be changed to a different depth in accordance with information pertaining to a desired panel configuration, and sends a signal to said motor means causing said motor means to rotate said machine screw by a predetermined amount.

8. Apparatus for crimping side portions of a formed, generally channel-shaped sheet metal panel having a bottom portion and side portions extending substantially perpendicular to the bottom portion so as to define an interior channel area and exterior areas, the bottom portion being crimped by main crimping rollers and the formed sheet metal panel being used in the construction of a metal building, said apparatus comprising:

inside crimping rollers and outside crimping rollers for crimping said side portions, said inside crimping rollers positioned within the interior channel area and the outside crimping rollers positioned in the exterior areas;

means for mounting said inside and outside crimping rollers to said apparatus so as to allow a distance between said inside and outside crimping rollers to be adjusted independently of adjustment of said main crimping rollers;

means for adjusting the distance between said inside and outside crimping rollers independently of adjustment of the main crimping rollers;

means for producing signals indicative of the distance between said inside and outside crimping rollers;

means for producing signals indicative of a length of said formed panel having passed through the apparatus; and means for controlling said adjusting means in response to said distance signals and said length signals based on a predetermined desired panel configuration.

9. Apparatus according to claim 8, wherein said mounting means comprises movable shaft means for mounting said inside crimping rollers to be movable toward and away from said outside crimping rollers.

10. Apparatus according to claim 9, wherein said mounting means further comprises stationary shaft means for mounting said outside crimping rollers to be stationary.

11. Apparatus according to claim 9, wherein said adjusting means comprises a first sliding block mounted to a support plate of said apparatus and supporting said movable shaft means.

12. Apparatus according to claim 11, wherein said adjusting means further comprises:

a second sliding block mounted to said support plate and supporting said movable shaft means;

a center linkage block coupled to said first and second sliding blocks;

a machine screw coupled to said center linkage block for adjusting the position of said center linkage block as a function of rotation of said machine screw; and motor means for rotating said machine screw.

13. Apparatus according to claim 12, wherein said distance signal producing means comprises a linear encoder for encoding the position of said machine screw relative to said support plate which is a function of the distance between said inside and outside crimping rollers, and said length signal producing means comprises a rotary encoder for encoding the amount of travel of said formed panel through said apparatus which is a function of the length of panel passing through said apparatus.

14. Apparatus according to claim 13, wherein said controlling means comprises a microprocessor which receives said length signals and distance signals, determines the depth of crimping to be applied to said side portions of said panel and the position along said panel at which said depth of crimping is to be changed to a different depth in accordance with information pertaining to a desired panel configuration, and sends a signal to said motor means causing said motor means to rotate said machine screw by a predetermined amount.

15. A method for regulating crimping of side portions of a formed, generally channel-shaped sheet metal panel having a bottom portion and side portions extending substantially perpendicular to the bottom portion so as to define an interior channel area and exterior areas, the bottom portion being crimped by main crimping rollers and said formed sheet metal panel being used in the construction of a metal building, said method comprising the steps of:

mounting side crimping rollers and outside crimping rollers to a side crimper such that the inside crimping rollers are positioned within the interior channel area and the outside crimping rollers are positioned in the exterior areas and so as to allow a distance between said inside and outside crimping rollers to be adjusted independently of adjustment of the main crimping rollers;

producing signals indicative of the distance between said inside and outside crimping rollers;

producing signals indicative of a length of said formed panel having passed through the apparatus; and adjusting the distance between said inside and outside crimping rollers independently of adjustment of said main crimping rollers in response to said distance signals and said length signals based on a predetermined desired panel configuration.

*16. An apparatus for automatically producing a building panel from sheet material, comprising:*

*a plurality of metal forming rolls for forming the sheet material into a shaped panel having a bottom portion and side portions wherein said side portions extend up from said bottom portion to form an interior channel area and an exterior area;*

*main crimping rollers that crimp said bottom portion;*

*a side crimper including outside crimping rollers and inside crimping rollers for crimping said side portions, the inside crimping rollers positioned within the interior channel area and the outside crimping rollers positioned on the exterior area;*

*said inside and outside crimping rollers adjustably mounted via a motor relative to each other on said apparatus to allow a distance between said inside and outside crimping rollers to be adjusted; and*

*a controller for adjusting a distance between said inside and outside crimping rollers.*

*17. Apparatus according to claim 16, wherein said side crimper includes at least one crimping roller mounted on a movable shaft wherein said shaft is movable toward and away from said panel side portion.*

*18. Apparatus according to claim 17, wherein said side crimper includes at least one crimping roller mounted on a stationary shaft.*

*19. Apparatus according to claim 17, wherein said side crimper include at least one crimping roller mounted on a stationary shaft.*

*20. Apparatus according to claim 17, wherein a plate attached to said apparatus supports said movable shaft and a sliding block.*

*21. Apparatus according to claim 20, further comprising:*

*a second sliding bock mounted to said support plate and supporting said movable shaft;*

*a center linkage block coupled to said first and second sliding blocks;*

*a machine screw coupled to said center linkage block for adjusting the position of said center linkage block as a function of rotation of said machine screw; and*

*said motor being configured to rotate said machine screw.*

*22. Apparatus according to claim 21, further comprising: a third sensor for detecting the position of said machine screw relative to said support plate.*

*23. Apparatus according to claim 22, wherein said controller receives signals from said first, second and third sensors, determines a depth of crimping to be applied to said side portions of said panel and the position along said panel at which said depth of crimping is to be changed to a different depth in accordance with information pertaining to a desired panel configuration, and sends a signal to said motor causing said motor to rotate said machine screw by a predetermined amount.*

*24. An apparatus for automatically producing a building panel from sheet material, comprising:*

*a plurality of metal forming rolls for forming the sheet material into a shaped panel having a bottom portion and side portions wherein said side portions extend up from said bottom portion to form an interior channel area and an exterior area;*

*main crimping rollers that crimp said bottom portion;*

*a side crimper including outside crimping rollers and inside crimping rollers for crimping said side portions,*

*the inside crimping rollers positioned within the interior channel area and the outside crimping rollers positioned on the exterior area;*

*said inside and outside crimping rollers adjustably mounted relative to each other on said apparatus to allow a distance between said inside and outside crimping rollers to be adjusted; and*

*a controller for adjusting a distance between said inside and outside crimping rollers.*

*25. An apparatus as in claim 24, wherein: said controller adjusts said main crimping rollers.*

*26. An apparatus as in claim 24, wherein: said controller adjusts said inside and outside rollers independent of said main crimping rollers.*

*27. An apparatus as in claim 24, further comprising: a first sensor indicative of the distance between said inside and outside crimping rollers.*

*28. An apparatus as in claim 27, further comprising: a second sensor indicative of a length of said formed panel having passed through the apparatus; and, said controller adjusting said crimping rollers in response to signals from said first and second sensors.*

*29. Apparatus according to claim 24, wherein said side crimper includes at least one crimping roller mounted on a movable shaft wherein said shaft is movable toward and away from said panel side portion.*

*30. A method of producing a building panel from sheet material, comprising:*

*forming sheet material into a shaped panel having a bottom portion and side portions wherein side portions extend up from said bottom portion to form an interior channel area and an exterior area;*

*crimping said bottom portion to produce a curve in at least a portion of said shaped panel;*

*crimping said side portions wherein depths of crimps in said side portion are adjustable to correspond to said curve in said shaped panel; and*

*controlling the depth of said side portion crimps to produce side portions having a plurality of crimp depths.*

*31. A method, as in claim 30, further comprising: adjusting the position of crimper rollers with respect to each other to control the depth of said side portion crimps.*

*32. A method, as in claim 31, wherein: said adjustment of said side crimper rollers occurs independent of adjustment of said bottom portion crimping.*

*33. A method, as in claim 32, further comprising: sensing the length of said formed panel and controlling the depth of said side portion crimps at least in part based on said length of said formed panel.*

*34. A method, as in claim 31, further comprising: adjusting said side crimper rollers with a machine screw coupled to a center linkage block, wherein said center linkage block is coupled to first and second sliding blocks, wherein said first and second sliding blocks are coupled to a movable shaft, wherein said movable shaft adjusts the position of one roller with respect to a second roller.*

* * * * *